(12) United States Patent
Falkiner et al.

(10) Patent No.: US 8,088,281 B2
(45) Date of Patent: Jan. 3, 2012

(54) SEPARATION OF HYDROCARBONS FROM WATER

(75) Inventors: Robert J. Falkiner, Ontario (CA); Bal K. Kaul, Fairfax, VA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 453 days.

(21) Appl. No.: 12/289,294

(22) Filed: Oct. 24, 2008

(65) Prior Publication Data

US 2009/0134094 A1 May 28, 2009

Related U.S. Application Data

(60) Provisional application No. 60/996,599, filed on Nov. 27, 2007.

(51) Int. Cl.
*B01D 11/00* (2006.01)
*B01D 61/00* (2006.01)

(52) U.S. Cl. ........ 210/634; 208/187; 210/799; 210/805; 210/806; 210/909

(58) Field of Classification Search .......... 210/634, 210/639, 702, 708, 799, 805, 806, 909; 208/33, 208/45, 179, 187
See application file for complete search history.

(56) References Cited

U.S. PATENT DOCUMENTS

| | | | | |
|---|---|---|---|---|
| 2,383,363 A * | 8/1945 | Batchelder | | 208/45 |
| 2,667,407 A * | 1/1954 | Fenske et al. | | 423/658.5 |
| 4,716,074 A | 12/1987 | Hurley et al. | | |
| 4,759,782 A | 7/1988 | Miller et al. | | |
| 4,824,555 A * | 4/1989 | Paspek et al. | | 208/187 |
| 4,839,054 A * | 6/1989 | Ruebush et al. | | 210/639 |
| 5,443,724 A | 8/1995 | Williamson et al. | | |
| 5,480,547 A * | 1/1996 | Williamson et al. | | 210/533 |
| 6,413,429 B1 * | 7/2002 | Breman et al. | | 210/634 |

FOREIGN PATENT DOCUMENTS

| | | |
|---|---|---|
| DE | 3415464 A1 | 10/1985 |
| DE | 4103162 A1 | 8/1992 |
| EP | 0100765 A1 | 2/1984 |

OTHER PUBLICATIONS

International Search Report, PCT/US2008/012841, mailed Mar. 2, 2009.
Written Report, PCT/US2008/012841, mailed Mar. 2, 2009.
Art Gardner, Refining Details: Advances in Liquid/Liquid Coalescing Technology, Today's Refinery, Mar. 1997.

* cited by examiner

*Primary Examiner* — Joseph Drodge
(74) *Attorney, Agent, or Firm* — Glenn T. Barrett; Malcolm D. Keen

(57) ABSTRACT

A method for the removal of entrained hydrocarbons, particularly aromatics, from water by extracting the hydrocarbons in the water with a hydrocarbon which is relatively less soluble in the water than the entrained hydrocarbon. The hydrocarbons are then separated from the water by a process of coalescence/separation. The extractant is suitably a paraffinic hydrocarbon which, while having an affinity for the entrained hydrocarbon, is relatively less soluble in water than hydrocarbons such as aromatics. The hydrocarbons removed from the water can be recirculated to the feed with the composition of the recirculating phase being controlled to achieve the desired level of hydrocarbon removal.

9 Claims, 1 Drawing Sheet

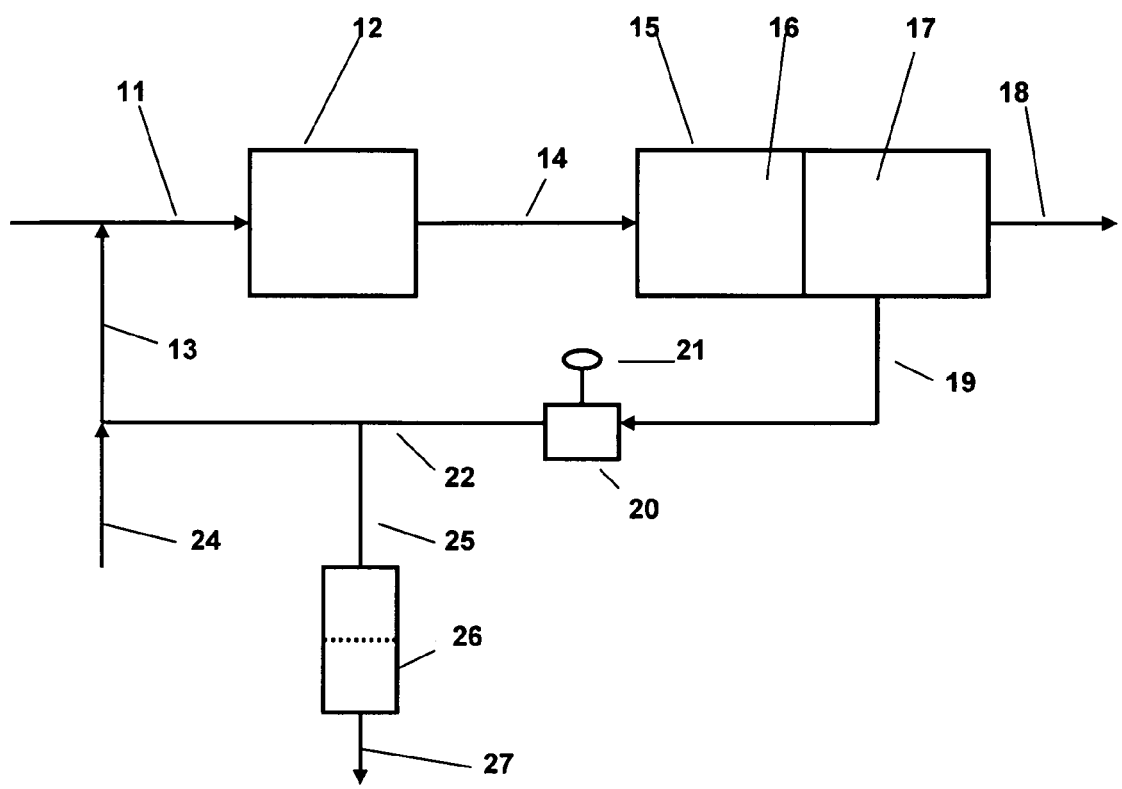

SEPARATION OF HYDROCARBONS FROM WATER

CROSS REFERENCE TO RELATED APPLICATION

This application relates to and claims priority to U.S. Provisional Patent Application No. 60/996,599 filed on Nov. 27, 2007.

FIELD OF THE INVENTION

This invention relates to a method for the separation of hydrocarbons, especially aromatic hydrocarbons with or without heteroatoms such as oxygen, sulfur, nitrogen, from water.

BACKGROUND OF THE INVENTION

Significant amounts of water are used in the processing of various liquid streams in petroleum refineries. For example, catalytic cracking uses steam stripping for removing cracked hydrocarbons from the catalyst, aqueous amine washes are used to remove hydrogen sulfide from hydrotreating operations, water washes are used in the desalting unit and aqueous caustic washes are often used to meet final product specifications. Water may also become contaminated with hydrocarbons from rainwater run-off and in many production operations, water or steam comes into contact with hydrocarbons, for instance, in steam stimulated heavy crude production, underground cavern storage (brine contamination) and the like. Although most of the hydrocarbons can be separated from the water by simple settling procedures, the water usually remains contaminated by residual quantities of hydrocarbons. The hydrocarbon contaminants usually require removal before the water is discharged to the environment and may even require some purification before being recycled for reuse. While knock out units may be sufficient for this purpose, their effectiveness is sometimes limited.

Environmental protection regulations are usually particularly strict in terms of controlling the quantities of aromatic hydrocarbons which are allowed to enter the environment as these compounds are considered to be relatively more toxic than other hydrocarbons. Biological oxidation (biox) units capable of removing hydrocarbons are, however, prone to damage from persistent high levels of entrained hydrocarbons, high hydrocarbon concentrations resulting from unit upsets or persistent high levels of entrained aromatics which are less readily amenable to biological oxidation than paraffins. Biox plants are usually protected by an API (gravity) settler which is intended to remove undissolved hydrocarbons to low levels of a few ppm but the settlers themselves can be disabled by a number of conditions such as the presence of surfactants that create an emulsion that will not settle, high levels of aromatics which have high surface tensions and are difficult to coalesce, and slugs of hydrocarbon that are large enough to carry through the separator. There is therefore a continuing need for a reliable process for separating residual hydrocarbons from water, especially for separating aromatics from water since these present the greatest difficulty in view of their relatively greater solubility in water coupled with their grater toxicity.

A technique which has, however, become commercially attractive in recent years is liquid/liquid coalescence. See, for example, *Refining Details: Advances in Liquid/Liquid Coalescing Technology*, Gardner, Today's Refinery, March 1997. The method of coalescing an liquid suspended in another immiscible phase using a coalescing device frequently referred to as a coalescer, has been found useful for removing liquids both from the gaseous phase as in aerosols and from suspensions of one liquid in another liquid with which it is immiscible but may be soluble to a limited degree. Coalescing devices are particularly effective where the volume of liquid to be removed is small in comparison to the volume of the phase from which it is removed so that the technique would appear to be of potential application for the separation of small quantities of hydrocarbons from water. The Gardener article discusses the factors that are relevant to the coalescence of droplets of the discontinuous phase from the continuous phase and the ease or difficulty of separation of the immiscible phases. These factors include the physical properties of the phases such as density, viscosity, surface tension and interfacial tension. In addition, the properties of the system such as drop size, curvature of the liquid/liquid interface, temperature, concentration gradients and vibrations may also affect the effectiveness of the coalescence. As noted in U.S. Pat. No. 5,443,724 (Williamson) any or all of these factors may be significant in a particular situation but the density, drop size and interfacial tension of the two liquids appear to be the most significant factors as well as those over the least amount of control can be exercised in affecting the separations.

The separation of aromatics from water presents, as noted above, particular difficulties. Aromatics have a relatively greater water solubility than non-aromatics and may also tend to form surfactants with other materials encountered during processing. Benzene, for example, is soluble in water to the extent of about 1500 ppm whereas the solubility of iso-octane is only about 10 ppm.

SUMMARY OF THE INVENTION

A method has been devised for the removal of hydrocarbons from water in a manner which is less prone to upsets and is relatively cheap and convenient. According to the present invention, entrained hydrocarbons are separated from water by extraction of the entrained hydrocarbons from the water with a hydrocarbon (or hydrocarbon mixture) which is relatively water insoluble compared to the entrained hydrocarbons, that is, less soluble than the hydrocarbons which are to be removed from the water, and in which the entrained hydrocarbons are more soluble than in water. The hydrocarbons are then separated from the water by subjecting the water/hydrocarbon mixture to coalescence/separation. The extractant hydrocarbon may suitably be circulated in a loop following separation from the water to extract further quantities of entrained hydrocarbon. Following the coalescence/separation step which removes the relatively insoluble extractant together with the more soluble aromatics and/or other hydrocarbons, the water can be discharged. The composition of the circulating hydrocarbon phase will change with the accumulation of the entrained hydrocarbons removed from the water (aromatics, napthenes, olefins); this composition can be allowed to vary within limits set by the required degree of separation or may be continuously maintained at a constant composition by once-through use with discharge of the contaminated extractant stream or by regeneration using other techniques such as distillation.

The method is of particular application to the removal of aromatics from water; aromatics which may be effectively separated using appropriate hydrocarbon extractants include aromatics with heteroatoms either as ring substituents (substituted homocyclics such as aniline) and heterocyclic compounds such as pyridine. Normally, the amount of heteroatom-containing aromatics in refinery streams is limited and therefore, for the purposes of the present invention, hydrocarbon streams containing components such as the heteroatom-containing compounds are to be regarded as hydrocarbons amenable to separation by the present process. For the purposes of the present process, the hydrocarbon extractant may be a paraffin, a cycloparaffin or even an olefin, all of which typically have lower water solubilties than aromatics. Paraffins are, however, to be preferred in view of their low mammalian toxicity.

DRAWINGS

The single FIGURE of the accompanying drawings is a schematic flowchart of a system for removing hydrocarbons from water using paraffin extraction and a coalescence/separation technique.

DETAILED DESCRIPTION

The present invention is applicable to the separation of hydrocarbons, especially aromatics, from water, particularly from water which has come into contact with hydrocarbons during production or refining operations, for example, steam stimulation techniques in enhanced oil recovery, refinery processing such as steam stripping, sour washes and caustic treating. The method is applicable to the removal of entrained free and dissolved hydrocarbons. Normally, the amount of entrained residual hydrocarbons which require to be removed from water is quite small as most will have been first separated by settling or other conventional techniques. Thus, the amount of entrained hydrocarbon which is present in the water prior to separation will be typically not more than about 5 volume percent. The problem however, lies in the fact that various hydrocarbons are soluble in water to varying degrees and cannot be readily separated by settling, centrifugation or other gravity-dependent techniques. Aromatics present a particular problem since they tend to be the most polar and therefore the most soluble hydrocarbons as shown by Table 1 below. They are also regarded as being the most toxic group of hydrocarbons and therefore particularly need to be separated from water which is to be discharged to the environment in order to comply with applicable regulations. As shown by the typical solubility values cited below, aromatic hydrocarbons tend to be at least one order of magnitude more soluble in water than paraffins and naphthenes (cycloparaffins); olefins are similar. The difference is solubility is, moreover, more marked in the case of aromatics which contain heteroatoms, either as ring substituents or ring members, as a consequence of the higher dipole moments of these compounds. Aniline, for example is soluble to the extent of about 3.4 percent, benzylamine is appreciably soluble and pyridine is freely soluble in water. These aromatic compounds—with or without heteroatoms such as nitrogen, sulfur or oxygen—may however be successfully separated from water by using an extractant which comprises a paraffin, cycloparaffin, or olefin (or mixture of them) for which the entrained compounds have a greater affinity. The contaminant compounds can subsequently be removed from the hydrocarbon stream by other means such as distillation or another extraction step while the extractant hydrocarbon is separated from the water using the coalescence/separation technique.

Table 1 shows the solubilities of various aromatic, paraffinic and cycloparaffinic hydrocarbons in water.

TABLE 1

Hydrocarbon Solubility in Water, 25° C., ppmw

| Formula | Hydrocarbon | Molecular Weight | Boiling Point (K) | Solubility in Water, 25° C., ppm wt. |
|---|---|---|---|---|
| Aromatics | | | | |
| C$_6$H$_6$ | Benzene | 78.113 | 353.31 | 1755.17 |
| C$_7$H$_8$ | Toluene | 92.14 | 383.73 | 542.37 |
| C$_8$H$_{10}$ | Ethylbenzene | 106.167 | 409.17 | 165.13 |

TABLE 1-continued

Hydrocarbon Solubility in Water, 25° C., ppmw

| Formula | Hydrocarbon | Molecular Weight | Boiling Point (K) | Solubility in Water, 25° C., ppm wt. |
|---|---|---|---|---|
| C$_8$H$_{10}$ | m-Xylene | 106.167 | 412.22 | 173.97 |
| C$_8$H$_{10}$ | o-Xylene | 106.167 | 417.46 | 220.83 |
| C$_8$H$_{10}$ | p-Xylene | 106.167 | 411.44 | 201.68 |
| Paraffins | | | | |
| C$_6$H$_{14}$ | Hexane | 86.177 | 341.93 | 9.47 |
| C$_6$H$_{14}$ | 2-Methylpentane | 86.177 | 333.4 | 13.00 |
| C$_6$H$_{14}$ | 3-Methylpentane | 86.177 | 336.35 | 17.91 |
| C$_6$H$_{14}$ | 2,2-Dimethylbutane | 86.177 | 322.87 | 23.82 |
| C$_7$H$_{16}$ | Heptane | 100.203 | 371.56 | 2.24 |
| C$_7$H$_{16}$ | 2-Methylhexane | 100.203 | 363.19 | 2.54 |
| C$_7$H$_{16}$ | 2,2-Dimethylpentane | 100.203 | 352.35 | 4.40 |
| C$_7$H$_{16}$ | 2,2,3-Trimethylbutane | 100.203 | 354.03 | 5.74 |
| C$_8$H$_{18}$ | Octane | 114.23 | 398.77 | 0.43 |
| C$_8$H$_{18}$ | 2-Methylheptane | 114.23 | 390.8 | 0.75 |
| C$_8$H$_{18}$ | 3-Ethylhexane | 114.23 | 391.7 | 0.71 |
| C$_8$H$_{18}$ | 2,2-Dimethylhexane | 114.23 | 380.01 | 1.39 |
| C$_8$H$_{18}$ | 3-Ethyl-2-Methylpentane | 114.23 | 388.81 | 0.84 |
| C$_8$H$_{18}$ | 2,2,3-Trimethylpentane | 114.23 | 383.25 | 1.16 |
| C$_8$H$_{18}$ | 2,2,3,3-Tetramethylbutane | 114.23 | 379.6 | 1.43 |
| Naphthenes | | | | |
| C$_7$H$_{14}$ | Ethylcyclopentane | 98.188 | 376.6 | 9.56 |
| C$_7$H$_{14}$ | 1,1-Dimethylcyclopentane | 98.188 | 361 | 22.53 |
| C$_7$H$_{14}$ | C-1,2-Dimethylcyclopentane | 98.188 | 372.68 | 11.91 |
| C$_7$H$_{14}$ | T-1,2-Dimethylcyclopentane | 98.188 | 365.01 | 18.16 |
| C$_7$H$_{14}$ | Methylcyclohexane | 98.188 | 374.08 | 16.00 |
| C$_8$H$_{16}$ | Propylcyclopentane | 112.214 | 404.1 | 2.04 |
| C$_8$H$_{16}$ | Ethylcyclohexane | 112.214 | 404.94 | 2.92 |
| C$_8$H$_{16}$ | 1,1-Dimethylcyclohexane | 112.214 | 392.7 | 5.99 |

The present separation technique depends for its effect upon the relatively greater affinity soluble hydrocarbons (with or without heteroatoms) for the hydrocarbon extractant as compared to the water; coupled with the relatively lower solubility of the extractant hydrocarbon in the water, the separation of the entrained hydrocarbons from the water becomes possible. The partition ratio for the entrained hydrocarbon (or substituted hydrocarbon) between the water and the extractant hydrocarbon phase is utilized in this initial step of the process to transfer the entrained hydrocarbons into the extractant phase, after which the coalescence technique is used to make a second separation, this time between the water and the hydrocarbon extractant. Once the more soluble, entrained hydrocarbons have been extracted into the hydrocarbon phase, a simple and efficient separation between the hydrocarbon phase and the aqueous phase results in a net removal of the more soluble hydrocarbon from solution in the water. Separation of the hydrocarbon phase from the water can be readily effected by the coalescence/separation technique.

In the present method, a paraffinic extractant is the preferred material used to extract the dissolved and/or suspended aromatic hydrocarbons from the water. An illustrative schematic of the process configuration is shown in the attached FIGURE by way of example.

In the FIGURE, the water containing the entrained hydrocarbons, particularly aromatics, naphthene and/or olefins, which are either dissolved and/or suspended in the water, is introduced by way of line 11 to prefilter 12 with the paraffinic extractant being injected through line 13. Prefilter 12 is suitably a mesh or screen filter with additional packing, e.g.

compressed glass fibers or polymer (nylon, polyolefin) mesh, adapted to remove fine particulate matter such as iron oxide, silica, which may stabilize hydrocarbon/water suspensions or emulsions and possibly damage the coalescer/separation units.

After passing through prefilter 12, the blend of hydrocarbons (i.e. the entrained hydrocarbon plus the extractant) and water passes through line 14 to coalescence/separation unit 15. Coalescer unit 15 is divided into two stages, comprising a first or coalescence stage 16 and a second or separation stage 17. In the coalescence stage, the suspended particles of hydrocarbon are subjected to coalescence into larger droplets in the presence of a suitable coalescing medium through which the liquids pass in order to effect the desired coalescence of the mixture of entrained hydrocarbon and hydrocarbon extractant. In separation stage 17, the combined fluids pass over a separation membrane which is selected to have a surface energy favoring passage of the hydrocarbon phase through the walls of the separation membrane while excluding the aqueous phase comprising the water from which the entrained hydrocarbons have been removed. The water, now containing only a very small and acceptable amount of entrained hydrocarbon, passes out of the coalescence/separation unit through line 18 to discharge or recycle to operations. The separated hydrocarbon phase, now containing the more soluble hydrocarbons removed from the original water feed stream, is removed through line 19 for recirculation to the water feed. A control valve 20 is provided in the recycle loop under control of manual or automatic controller 21 to permit actuation of the recycle when required.

The stream of extractant hydrocarbon in the recirculation loop water passes from control valve 20 to injection line 13 through line 22 with additional extractant being injected if required through line 24 in order maintain the desired extractant content for effective removal of entrained hydrocarbon and to permit effective coalescence and separation. As hydrocarbon is progressively removed from the aqueous feed, and makeup extractant is added, excess hydrocarbon (extractant plus removed hydrocarbon) may be purged through the circuit through line 25 to dump tank 26 from which it may be removed through line 27. While it is acceptable to allow an accumulation of removed hydrocarbon in the recirculation loop up to a permitted maximum set by processing requirements (permissible entrained hydrocarbon concentration in product water, acceptable extractant loss to water), the composition of the fluid in the loop may be maintained at a constant value by periodic or continuous addition of extractant accompanied by removal of excess circulating liquid. Removal of the excess hydrocarbon may be carried out continuously or periodically or, as an alternative, it may be possible, depending on the identity of the hydrocarbons which are being used as the extractant and of those which are being removed from the water, to maintain the gross composition of the hydrocarbons in the recycle loop at a relatively constant value by separation of the extractant, for example by distillation by flash separator or a limited number of stages in a distillation tower. Reclamation of the extractant in this way is potentially attractive since the regenerated extractant is recycled directly to the process. Alternatively, the extractant may be used on a once through, total loss, basis by removing it together with the hydrocarbons removed from the water to other uses, e.g. into the refinery fuel pool.

The hydrocarbon which is used to extract the entrained hydrocarbons from the water feed stream is soluble in water to only a limited extent as compared to the hydrocarbon originally present in the water, which has a relatively higher water solubility, either by reason of its inherent solubility (see Table 1) or from the presence of surfactants. Paraffins such as those shown in Table 1 may be used but normally, it will be more economical to use paraffinic refinery streams such as straight light run naphtha (SLR), naphtha reformer feed or alkylate. While these streams may contain aromatic, naphthenic or even olefinic contaminants, the concentration of these materials in the streams may be sufficiently low compared to that of the hydrocarbons in the water to make their use feasible as a means of extracting the entrained hydrocarbons from the water. The paraffinic solvent should, in any case, have an affinity for the entrained hydrocarbons) and a more limited solubility in water; both of these factors may be determined by a simple bench scale test. The use of paraffinic refinery streams such as LSR or alkylate represents a very attractive option because they:

are readily available, usually at low cost,
can be used on a once-though basis and returned to conventional refinery processing or use (e.g in the refinery fuel pool, either gasoline or distillate, depending on boiling point),
are thermally stable,
have low water solubility (e.g. alkylate is less than 2 ppm as against 1725 ppm for benzene at 25° C.),
have surface tension and density properties appropriate for liquid/liquid coalescing, and
have low odor, volatility and toxicity in the treated water.

The amount of the paraffinic solvent which is added relative to the aqueous feed depends mainly on the extent to which the entrained hydrocarbons need to be extracted from the water. As noted above, a loss of the solvent to the water may take place but this is normally minor in view of the limited solubility of the paraffins or other extractants in water. Normally, the amount of extractant will be up to about 10 volume percent of the water feed stream and in most cases from 0.25 to 5 volume percent, e.g. from 5.5 to 3 volume percent, will be satisfactory for good coalescing. The exact amount chosen however will depend upon the relative solubilities of the entrained hydrocarbons and of the selected extractant and upon the amount of entrained hydrocarbon in the water as well as of the extent to which the entrained hydrocarbon is to be removed. Optimum extractant/water ratios may be found by simple experiment.

The liquid-liquid coalescence operates in three stages, as noted in *Liquid-Liquid Separation Technology*, Oil & Gas Journal, 16 Apr. 2001, 54-57, namely separation of solids, coalesence and separation of coalesced droplets.

The prefilters which are used ahead of the coalescer may be any suitable type of conventional filter, including sand filters, metal or polymer meshes, or other porous material capable of removing small solid particles which would tend to stabilize hydrocarbon/water emulsions and which might result in damage to the more delicate coalescer membranes. Polyester and nylon mesh filters are suitable, typically with crush strengths in the range of 70-145 kg·cm$^{-2}$ (75-150 psi) and other non-woven filter materials may be used as convenient alternatives. The filter material may be contained in a conventional filter housing and the filter material in any convenient configuration which provides the desired filter life, filtration capacity and flow rate, for example, pleated mats, cylindrical sheets or mats, helical or spirally wound mats.

In a similar manner, the material of the coalescer and separation elements in the coalescing unit and the separation unit may be provided in a form which provides the necessary mechanical strength, liquid flow rate and unit life. In the simplest form, the media serving as the coalescer and separator materials may be provided in sheet form which may be formed either as flat sheets, pleated or corrugated sheets or in other suitable arrangements e.g. cylindrically, helically or spirally wound sheets, as disclosed in U.S. Pat. No. 5,443,724 to which reference is made for a disclosure of suitable coalescer and separator materials and configurations for them.

The coalescer promotes the coalescence of the discontinuous or highly divided phase of the water/paraffin mixture comprising the paraffin extractant and its dissolved hydrocarbon present in the form of finely divided droplets into larger and coarser droplets. The pore structure of the coalescer begins with a very fine structure and then opens up to provide void space for the coalescing droplets. The coalescence mechanism has been stated (Hampton, op cit.) to involve the adsorption of droplets by the fibers of the coalescence material followed by translation along the fibers and collisions at the junctures of fibers. The collisions result in droplets merging or coalescing and the viscous drag of the bulk fluid stream then causes the enlarged drops to disengage from the fibers. This process is repeated several times through the coalescer medium until the large, coalesced drops leave the coalescer medium. Once coalesced, the droplets are assumed to be as large as possible for the given flow conditions. Separation them removes the drops from the main body of liquid.

The coalescing material is used in the form of a packing formed of a material which has a critical wetting surface energy intermediate the surface tensions of the liquids forming the continuous and discontinuous phases, that is, of the hydrocarbon component and the water. Similarly, the material of the separating element is selected so as to have a surface energy which permits passage of the coalesced droplets made up of extractant plus removed hydrocarbon through the small pores of the separator material but to preclude transfer of the water across the wall. As disclosed in U.S. Pat. No. 5,443,724, materials preferred for use as the phase barrier material for the separator include silicones, such as silicone treated paper and more preferably fluoropolymeric materials of which fluorocarbons or perfluorocarbons (perfluoro resins) are particularly preferred. Examples of preferred materials for use as the packing or coating in the separator include polytetrafluoroethylene (PTFE) or other polyfluorinated polymers such as fluorinated ethylenepropylene (FEP) resins. As noted, a preferred separator material includes a coating of one of these materials on a stainless steel screen or a pleated paper pack. Other suitable materials include those disclosed in U.S. Pat. No. 4,759,782 to which reference is made for a disclosure of such materials. Generally, the phase barrier material which acts to prevent the discontinuous phase passing through it (and is therefore appropriately referred to as the discontinuous phase barrier material) is selected to have pores smaller than a substantial amount of the droplets of the liquid which forms the discontinuous phase. Typically, the pore size of the functional part of the separator material is selected to be from 5 to 140 microns, preferably 40 to 100 microns.

The coalescing unit and the separation unit may suitably be contained in a housing which provides and adequate number of coalescing/separating elements with these elements being suitably arranged inside the housing for reasons of functionality and operating convenience. A suitable arrangement is shown in U.S. Pat. No. 5,443,724, using coalescer and separator cartridge elements arranged in super posed relationship with one another in a cylindrical type housing which permits ready access to the cartridges when they require replacement. However, other configurations may be used and reference is made to commercial suppliers of this equipment including Pall Corporation of East Hills, N.Y. 11548.

We claim:

1. A method for removing aromatic hydrocarbons entrained in a feed stream of water in an amount up to about 5 volume percent, which comprises:
   mixing the water stream with a paraffinic hydrocarbon extractant which has a lower water solubility than the entrained aromatic hydrocarbons, in an amount up to 10 volume percent of the water stream,
   subjecting the mixed water/hydrocarbon stream to coalescence/separation to coalesce the hydrocarbon components of the mixture entrained in the water to form larger size coalesced liquid droplets by prefiltering the stream to remove particulate matter, coalescing finely divided droplets of a discontinuous hydrocarbon phase of the water/hydrocarbon stream which are entrained in a continuous water phase into larger, droplets, and
   separating the coalesced liquid droplets comprising hydrocarbon extractant and removed hydrocarbons from the water by passing the coalesced liquid droplets and water in contact with a membrane separating element having a wall of a continuous phase barrier material having a surface energy selected to preclude transfer of the continuous water phase across the wall while permitting passage of the coalesced droplets of the paraffinic extractant and extracted aromatic hydrocarbon through the separator material.

2. A method according to claim 1 in which the paraffinic hydrocarbon extractant comprises a lower paraffin of from 4 to 10 hydrocarbons.

3. A method according to claim 1 in which the volume ratio of the hydrocarbon extractant to the water stream is from 0.1 to 10 volume percent.

4. A method according to claim 3 in which the volume ratio of the hydrocarbon extractant to the water stream is from 0.5 to 5 volume percent.

5. A method according to claim 1 in which the mixture of paraffinic hydrocarbon extractant and extracted aromatic hydrocarbons is recirculated to the feed stream of water.

6. A method according to claim 5 in which the concentration of the removed hydrocarbons in a recirculating extractant gradually increases with removal of hydrocarbons from the water stream.

7. A method according to claim 6 in which the composition of the recirculating extractant stream is controlled to achieve the requisite level of hydrocarbon removal by separation of the extracted aromatic hydrocarbons from the paraffinic hydrocarbon extractant.

8. A method according to claim 7 in which the composition of the recirculating extractant stream is controlled by addition of the paraffinic extractant hydrocarbon to the recirculating stream.

9. A method according to claim 7 in which a portion of the recirculating stream is removed from the recirculation.

* * * * *